US005558037A

United States Patent [19]

Manning

[11] Patent Number: 5,558,037
[45] Date of Patent: Sep. 24, 1996

[54] SEMISUBMERSIBLE VESSEL WITH FORWARD-MOUNTED CRANE

[76] Inventor: Foster T. Manning, 193A Goldhill Centre, Newton/Thomson Roads, Singapore 1130, Singapore

[21] Appl. No.: 404,590

[22] Filed: Mar. 15, 1995

[51] Int. Cl.[6] .......... B62B 27/00
[52] U.S. Cl. .......... 114/264; 212/309
[58] Field of Search .......... 212/307, 309; 1.4/264, 265, 266, 268; 405/195, 196, 197, 198, 203, 204, 210

[56] References Cited

U.S. PATENT DOCUMENTS

| | | | |
|---|---|---|---|
| 3,685,305 | 8/1972 | Lloyd, III | 61/72.3 |
| 3,835,800 | 9/1974 | Lloyd, III et al. | 114/0.5 R |
| 3,894,503 | 7/1975 | McClure | 114/0.5 R |
| 4,165,702 | 8/1979 | Lloyd, III et al. | 114/65 R |
| 4,207,828 | 6/1980 | Horowitz et al. | 114/125 |
| 4,231,313 | 11/1980 | Heerema et al. | 114/265 |
| 4,232,625 | 11/1980 | Goren et al. | 114/264 |
| 4,281,615 | 8/1981 | Wilson et al. | 114/265 |
| 4,385,583 | 5/1983 | Ayers | 114/265 |
| 4,417,664 | 11/1983 | Gordon | 212/307 |
| 4,471,708 | 9/1984 | Wilson et al. | 114/265 |

*Primary Examiner*—Stephen Avila
*Attorney, Agent, or Firm*—Joan H. Pauly

[57] ABSTRACT

A drilling tender (2) has a pair of laterally spaced buoyant hulls (4) with ballast chambers to permit the hulls to be moved between a submerged condition and a surface floating condition. Each hull (4) supports a row of columns (8). The columns (8) support a working platform (10) including a main deck (12) and a pipe rack deck (30) above the main deck (12). A bow deck (48) above a forward portion of the pipe rack deck (30) has mounted on a corner portion thereof a main heavy duty crane (50). The support structure for the crane (50) extends downwardly through the decks (12, 30, 48) and down into one of the columns (8). Between the main and pipe rack decks, the support structure is formed by a plurality of bulkheads. These bulkheads have portions extending down into the column (8) to transmit forces created by operation of the crane (50) to the column (8). A personnel bridge (80) is pivotably mounted on the bow deck (48) to allow its free end to be pivoted onto a fixed-position work platform being serviced by the tender (2). An auxiliary crane (70) is mounted on the pipe rack deck (30) rearwardly of and laterally opposite the main crane (50).

16 Claims, 13 Drawing Sheets

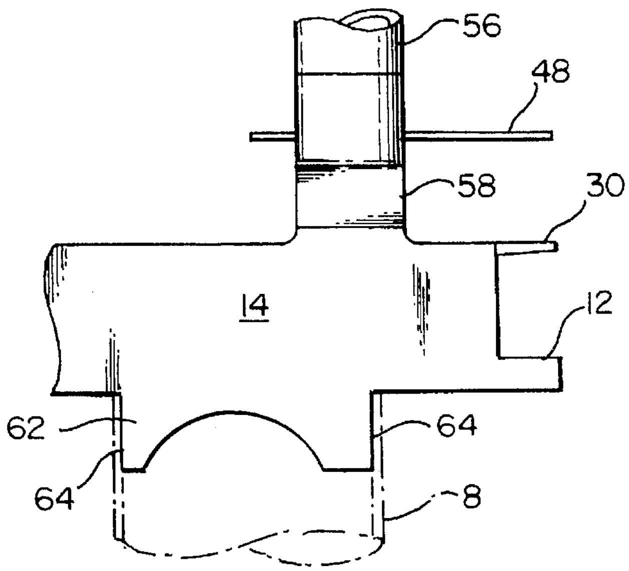
FIG. 7B
FIG. 7C
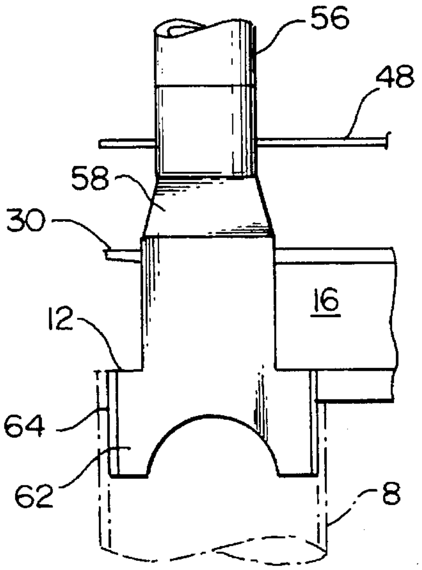
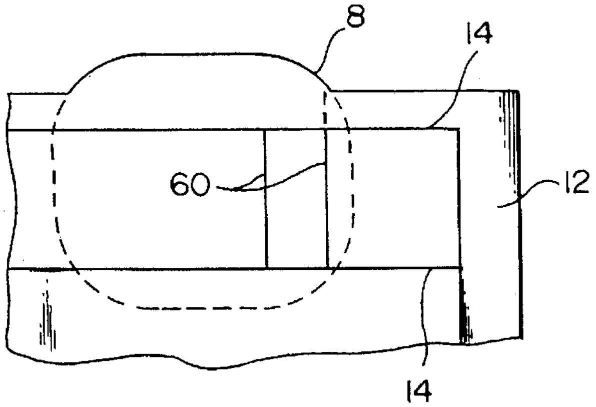
FIG. 7D
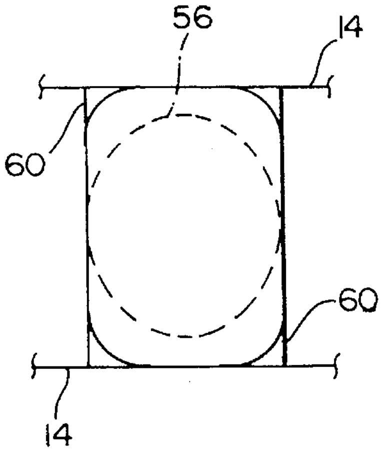
FIG. 7E

FIG. 13
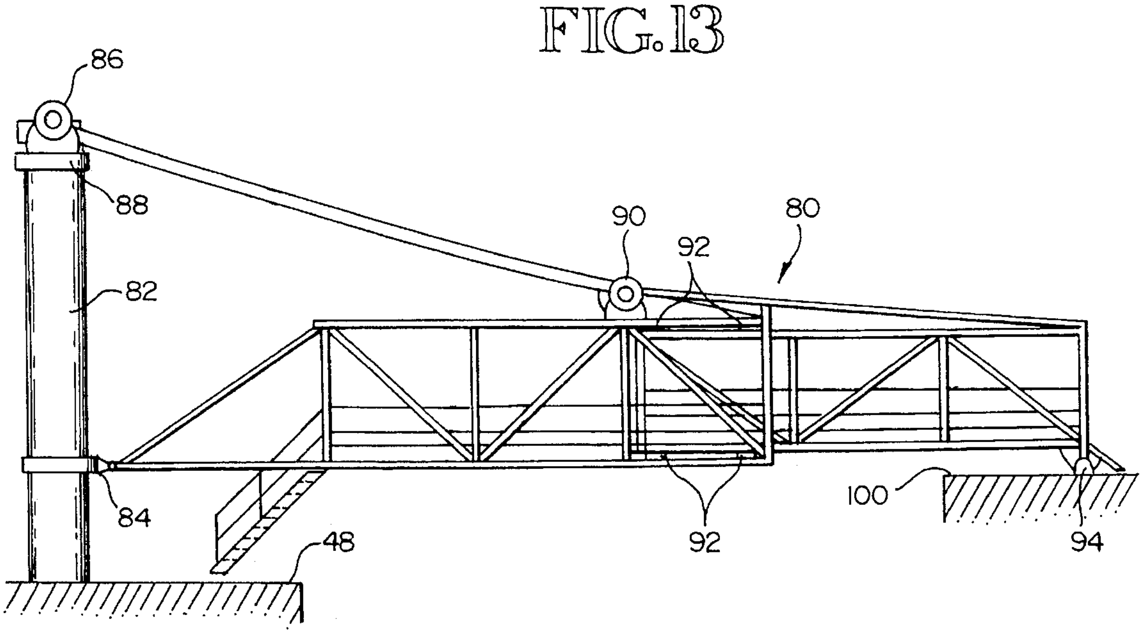
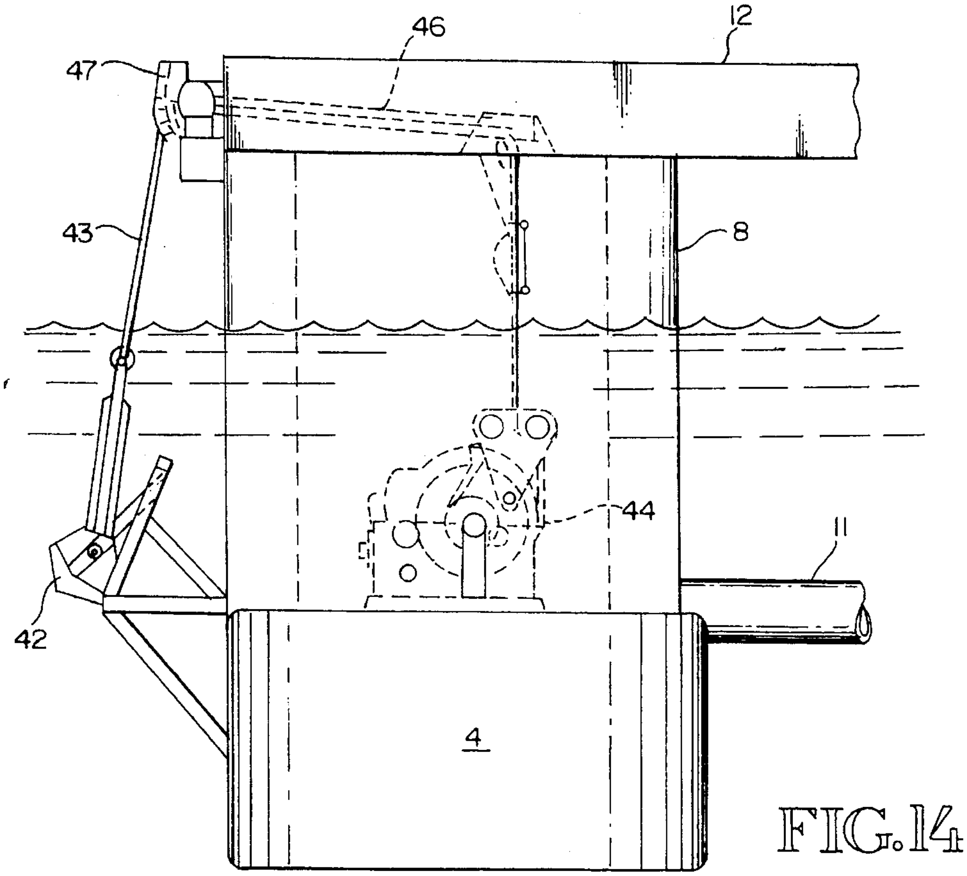
FIG. 14

SEMISUBMERSIBLE VESSEL WITH FORWARD-MOUNTED CRANE

TECHNICAL FIELD

This invention relates to a tender vessel having a working platform supported on columns extending upwardly from a pair of hulls that may be ballasted to submerge the hulls and, more particularly, to such a vessel having a forward-mounted high capacity crane mounted on a partial forward deck and/or a support structure extending downwardly to one of the columns.

BACKGROUND INFORMATION

The present day demand on the offshore oil and gas industry for greater safety and efficiency is the strongest in the history of the industry. This demand makes it necessary for equipment to be sufficiently versatile to be economically and operationally efficient without compromising safety to personnel, equipment, or the well. Drilling of the well is the primary function in obtaining oil and gas. Subsequent well workover or servicing is necessary to realize the maximum product output potential of the well. The workover or servicing is normally done continually at regular intervals, such as annually or biannually, over many years. Some wells have been known to produce over a forty-year period.

Offshore industry requirements have led to the development and construction of various special purpose marine structures capable of continuous operation in the offshore environment for extended periods of time. For example, one such structure that is commonly employed is a fixed, self-contained drilling and production platform erected on piles driven into the sea floor. A drilling workover or service rig, auxiliary equipment, and crew quarters are mounted on the platform. A commonly used variation of this type of structure is a smaller platform similarly erected on piles and having a drilling, workover, or servicing rig located thereon. The auxiliary equipment and crew quarters are located on a separate tender barge tied alongside.

Mobile tender vessels are required to erect a rig in the offshore environment, to dismantle the rig in the case of discontinued drilling, and to carry out workover or servicing. Conventional tender vessels take the form of barges on which are mounted heavy duty derricks or cranes. The cranes are used to lift, transfer, and set into place the parts forming the rigs. A tender barge typically has space on board to transport the rig parts, and the barge-mounted crane is used to lift and set the rig parts onto the platform.

Conventional tender barges employed for erecting, dismantling, and servicing oil and gas drilling and production platforms are single hull surface floating vessels that are either towed or self propelled to and anchored at the platform site. This type of tender vessel has the major disadvantage of being highly restricted in terms of the sea conditions in which it can be used for rig erecting and dismantling and servicing operations. In sea states with even moderately high wave heights, the tender vessels have a high level of motion in heave, pitch, and roll and a tendency toward abrupt correcting motions when the vessel is subjected to roll or pitch excitations. For example, surface floating tender barges currently employed for offshore operations generally are restricted to operation in sea states having wave heights of no more than five to six feet. The wave action against the vessel caused by sea states having wave heights in excess of these limits normally causes vessel motion at a level sufficiently high to create a risk of structural or wire failures in the vessel's crane. This risk precludes crane operations. Thus, operations utilizing conventional barges are normally halted when high sea state conditions are encountered and are resumed only when the sea state subsides to within the limits.

The above-discussed shortcomings of conventional tender barges have been recognized in the industry for a number of years. There have been proposals for overcoming the shortcomings by providing a semisubmersible vessel having a working platform supported on columns extending upwardly from a pair of hulls that may be ballasted to submerge the hulls. U.S. Pat. No. 3,835,800, granted Sep. 17, 1974, to S. H. Lloyd III et al., discloses a semisubmersible derrick barge in which a heavy duty derrick or crane is mounted at one end of the barge on the longitudinal centerline of the barge. The disclosed barge is also the subject of U.S. Pat. No. 4,165,702, granted Aug. 28, 1979, to the same inventors. Other proposals for semisubmersible vessels are found in U.S. Pat. No. 3,894,503, granted Jul. 15, 1975, to A. C. McClure; U.S. Pat. No. 4,207,828, granted Jun. 17, 1980, to A. Horowitz et al; U.S. Pat. No. 4,231,313, granted Nov. 4, 1980, to P. S. Heerema et al.; U.S. Pat. No. 4,232,625, granted Nov. 11, 1980, to Y. Goren et al.; and U.S. Pat. No. 4,281,615 and U.S. Pat. No. 4,471,708, granted Aug. 4, 1981, and Sep. 18, 1984, respectively, to J. H. Wilson et al. Each of these patents discloses a tender barge, except the Goren et al. patent, which discloses a semisubmerged drilling vessel. Also of interest is U.S. Pat. No. 3,685,305, granted Aug. 22, 1972, to S. H. Lloyd III, which discloses a pipeline laying barge.

SUMMARY OF THE INVENTION

The present invention is directed toward a semisubmersible floating vessel having optimized operating characteristics. The vessel is of a type having a pair of substantially parallel, laterally spaced buoyant hulls with ballast chambers to permit the hulls to be moved between a submerged condition and a surface floating condition. A row of columns is supported by and extends upwardly from each of the hulls. A working platform is supported by the upper ends of the columns.

According to an aspect of the invention, the vessel comprises a crane mounted on the working platform adjacent to an end on the platform. The crane has sufficient capacity to lift loads off said end of the platform and at least one side of the platform and from a portion of the platform extending from said end of the platform to at least about halfway to an opposite end of the platform. A support structure for the crane is provided. The structure extends downwardly from the crane and through the platform to and down into one of the columns. The structure interfaces with sidewall portions of this column to transmit forces created by operation of the crane to the column.

The structural design of the working platform and the crane support structure may be varied considerably. Preferably, the platform includes a first deck adjacent to the upper ends of the columns, and a second deck spaced above the first deck. The crane support structure includes a plurality of bulkheads extending vertically between the decks and having portions extending vertically down into the column. The downwardly extending bulkhead portions interface with the column to transmit crane operational forces to the column. Preferably, the bulkheads have edge portions that are secured to inner surface portions of the column. In the preferred embodiment, the working platform also includes a forward deck positioned above a forward portion of the second deck. The crane is mounted on the forward deck. The support structure includes a crane column support extending downwardly from the crane through the forward deck to the bulkheads.

The vessel may also be provided with one or more auxiliary cranes. In the preferred embodiment, the main crane described above is mounted on a forward corner portion of the platform, and an auxiliary crane is mounted on the second deck rearwardly of and laterally opposite the main crane. Another preferred feature of the vessel is providing a working platform that forms a buoyant body to provide the vessel with reserve buoyancy.

According to another aspect of the invention, the vessel comprises a main deck portion and a forward deck portion. The main deck portion is supported by and extends over each of the columns and has a forward end. The forward deck portion is positioned above a forward portion of the main deck portion and has a forward end substantially aligned with the forward end of the main deck portion. The rearward extent of the forward deck portion is sufficiently short to leave at least about one half of the main deck portion uncovered. A crane is mounted on the forward deck portion. The crane has sufficient capacity to lift loads off the forward ends of the deck portions and at least one side of the platform and from a portion of the main deck portion extending rearwardly from the forward deck portion to a location about halfway from the forward end of the main deck portion to an opposite end of the main deck portion. A support structure for the crane extends downwardly from the crane, through the forward deck portion at least to the main deck portion. Preferably, the main deck portion includes first and second decks, and the support structure includes a plurality of bulkheads and a crane column support, as described above.

According to still another aspect of the invention, the vessel comprises a main deck portion, a forward deck portion, and a crane, as described in the last paragraph. The vessel further comprises a personnel bridge having a first end pivotably mounted on the forward deck portion, and a second free end. The columns are dimensioned, and the forward deck portion has a height relative to the columns, to permit the forward deck portion to be substantially vertically aligned with a fixed-position work platform being serviced by the vessel when the hulls are in a submerged condition. This, in turn, permits the bridge to be pivoted to move the free end onto the work platform.

The basic structure of the vessel of the invention, including its buoyant and submersible hulls and column supported working platform, solves the problem discussed above of the severe restrictions on use conditions of conventional surface floating tender barges. Vessels constructed according to the invention have minimized vessel motion due to excitation forces caused by wave action in a wide range of sea states. Operation of the vessel's crane may be safely continued in all but the most severe sea conditions. Thus, tender operations may be carried out reliably and quickly with little, if any, down time. The elimination of down time makes the vessel highly cost effective as well as reliable and safe. The preferred deck configuration of the vessel and mounting of the crane enables the crane to be optimally positioned adjacent to a fixed work platform to carry out tender operations, while at the same time allowing the center of gravity of the vessel to be maintained as low as possible. The mounting of a personnel bridge on a forward deck enhances the desirable operational characteristics of the vessel by providing convenient and safe access for personnel between the tender and the fixed work platform.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 7B is an elevational view of the structure shown in FIG. 7A looking outboard toward the port side of the vessel.

FIG. 7C is an elevational view of the structure shown in FIGS. 7A and 7B looking forward toward the bow of the vessel.

FIG. 7D is a schematic plan view illustrating the structure shown in FIGS. 7A–7C.

FIG. 7E is a schematic plan view illustrating the relationship between the crane column support and bulkheads shown in FIGS. 7A–7D.

FIG. 13 is an elevational view of the preferred embodiment of the personnel bridge.

FIG. 14 is an elevational view of one of the columns, with the column-mounted anchor winches shown in phantom.

BEST MODE FOR CARRYING OUT THE INVENTION

Figure 1:
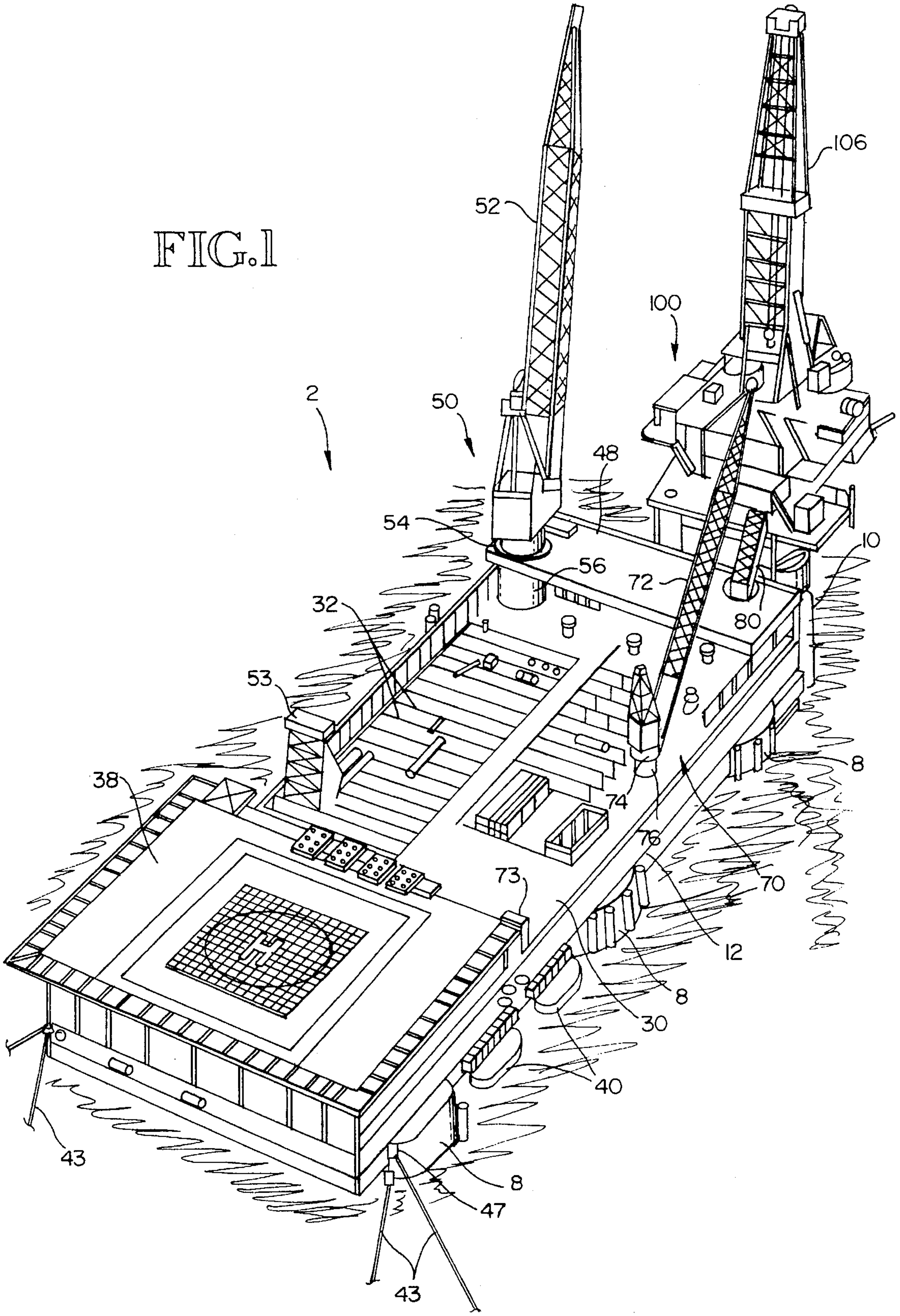
FIG. 1 is a pictorial view of the preferred embodiment of the invention shown floating in a semisubmerged condition, looking down at the starboard side and aft end of the vessel.
Figure 2:
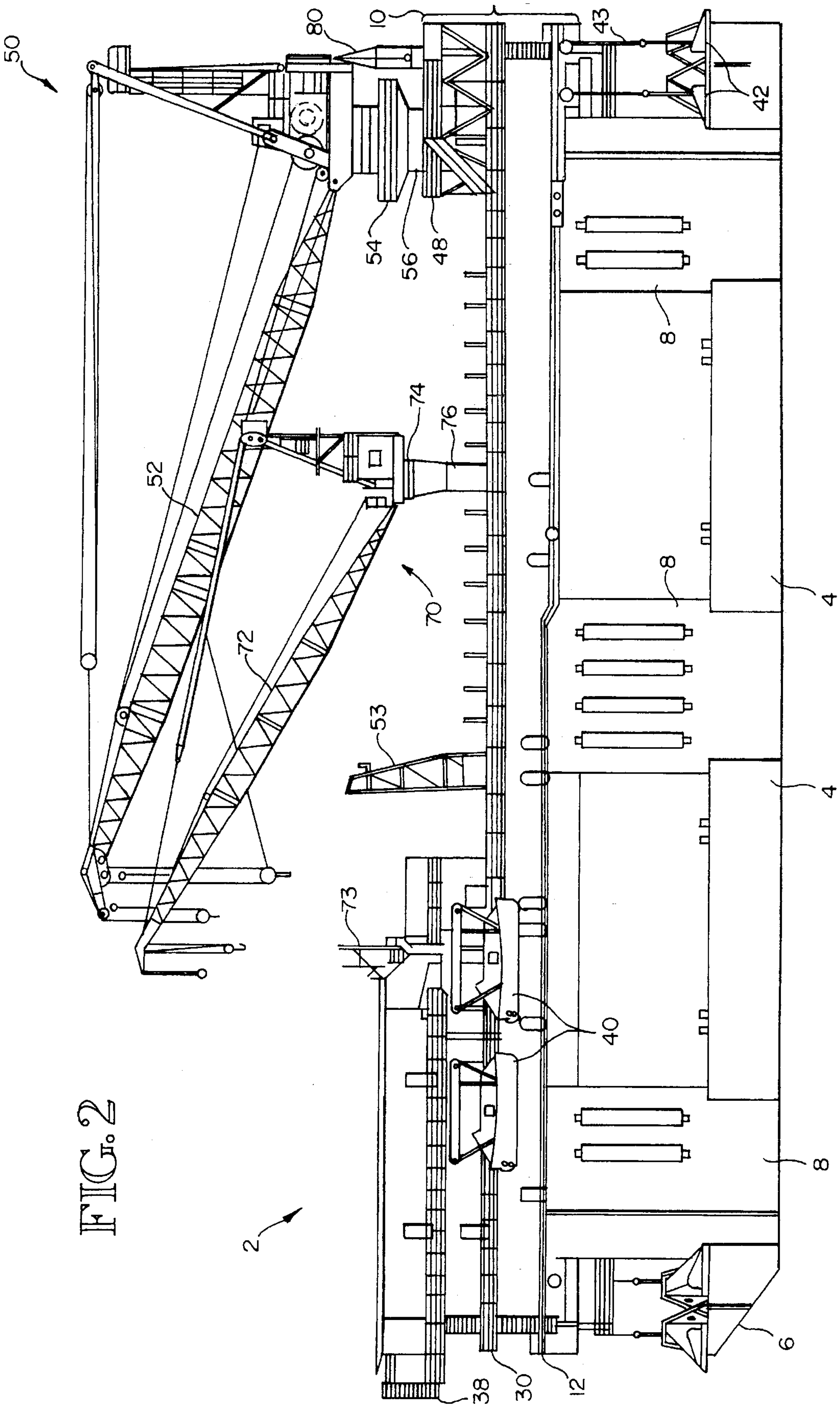
FIG. 2 is an elevational view of the vessel shown in FIG. 1 looking toward the starboard side.
Figure 3:
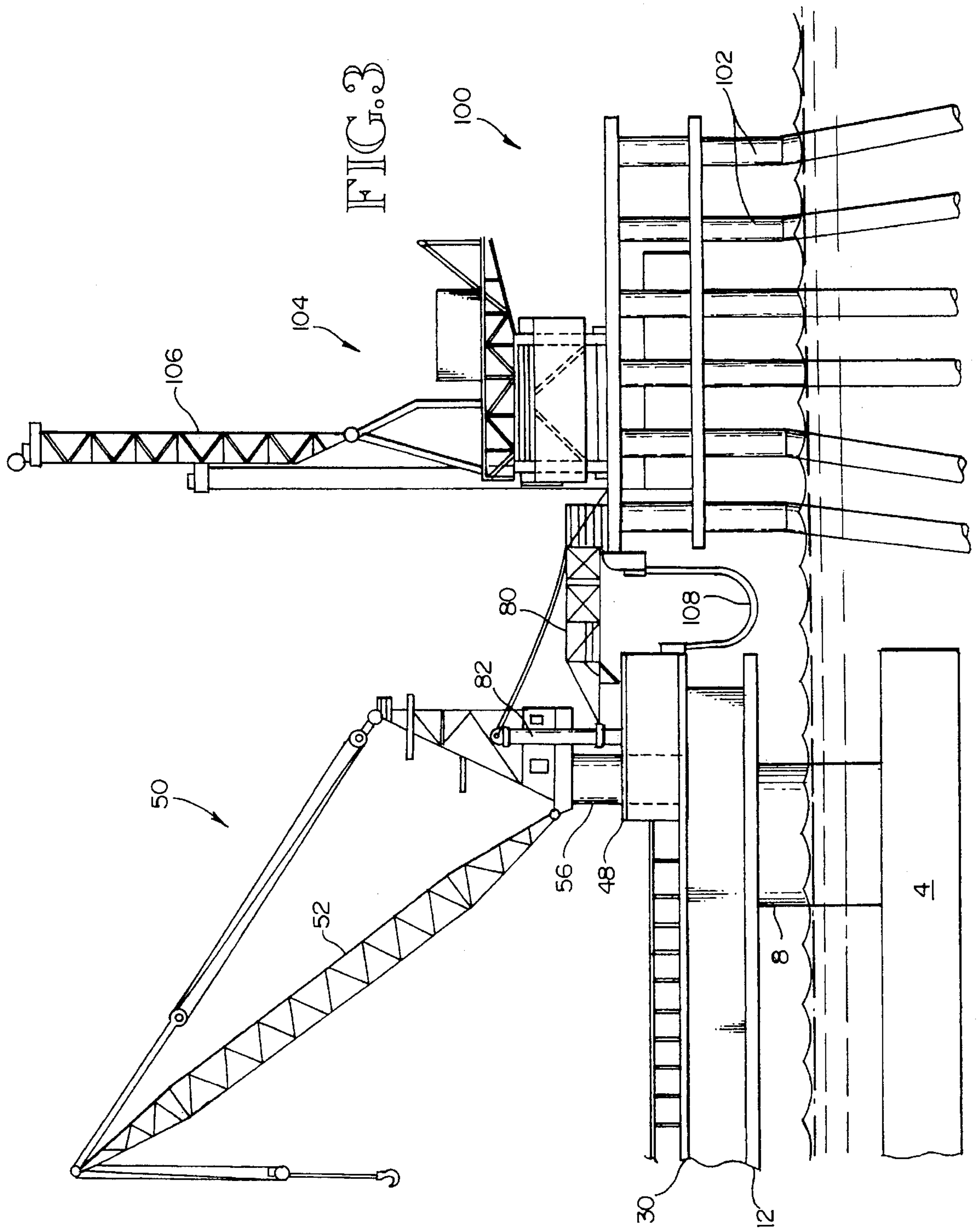
FIG. 3 is an elevational view of the forward portion of the starboard side of the vessel shown in FIGS. 1 and 2 and an adjacent fixed-position work platform.

The drawings show a semisubmersible vessel 2 that is constructed according to the invention and that constitutes the best mode of the invention currently known to the applicant. The vessel 2 has two parallel, elongated and laterally spaced buoyant hulls 4. At one end of the vessel 2, the end 6 of each hull 4 is tapered to provide minimum resistance to towing. As described herein, this end of the vessel 2 is referred to as the aft or rear end, and the opposite end is referred to as the forward or bow end. Thus, when the vessel 2 is being towed to and from a work site, it is towed stern first. The bow end is the end which is positioned adjacent to a fixed-position work platform during servicing of the work platform.

A row of columns 8 is supported by and extends upwardly from each hull 4. To help maximize vessel stability, each column 8 has a constant cross section throughout its effective height. The number of columns 8 in each row may be varied. In the illustrated preferred embodiment, there are three columns 8 in each row with each column 8 in each row positioned laterally opposite a column 8 in the other row. The middle pair of columns 8 is preferably located so that the pitch axis of the vessel 2 intersects the column centerlines. The other two pairs are located on the corners of the vessel 2. Preferably, the columns 8 are arranged symmetrically on opposite sides of the roll axis.

Figure 12:
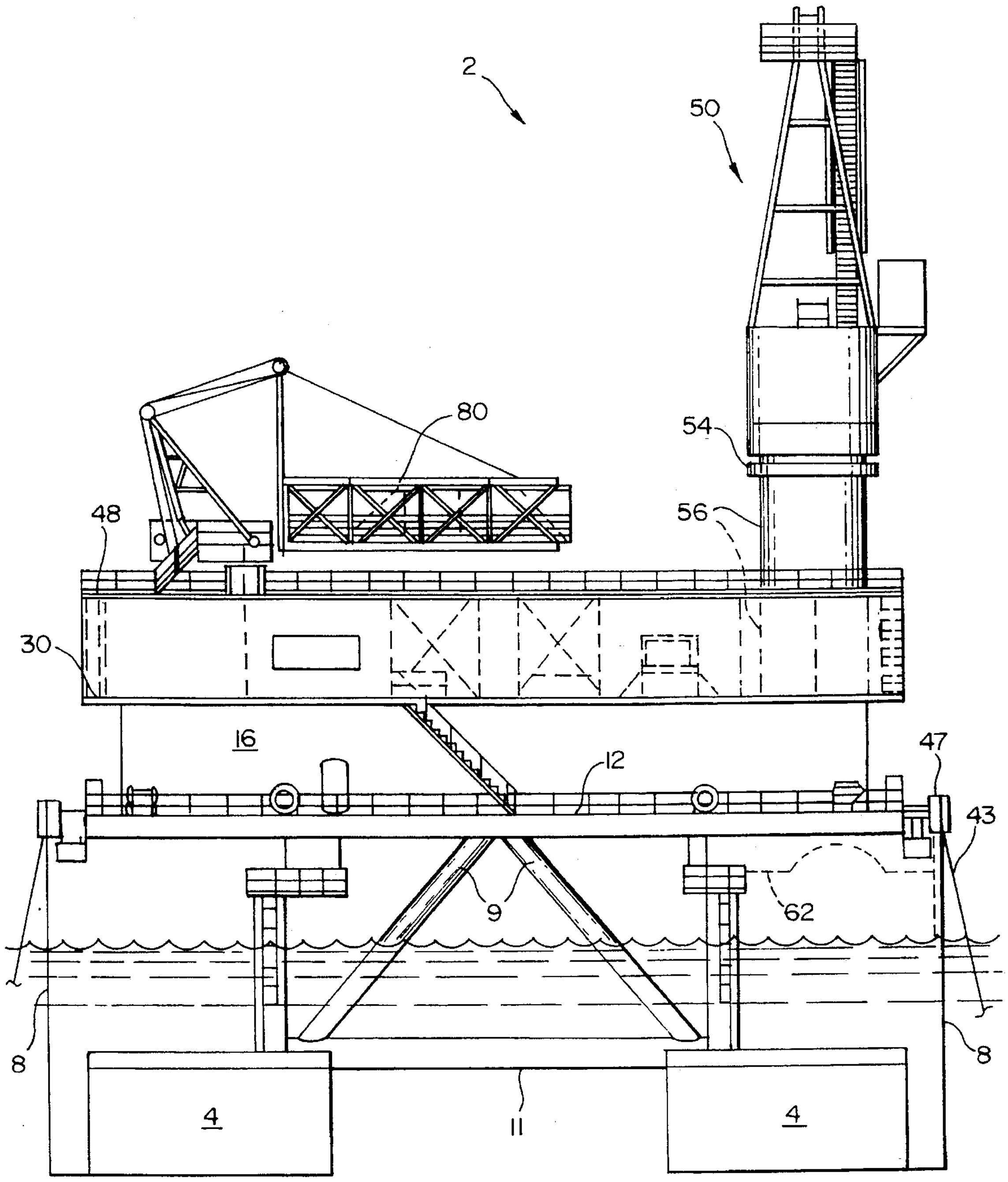
FIG. 12 is an elevational view looking toward the bow or forward end of the preferred embodiment of the vessel.

Referring specifically to FIG. 12, triangular trusses 9, 11 are provided between the two hulls 4 to stabilize the hull/column structure. Preferably, there are three trusses 9, 11 each of which is aligned with the lateral centerlines of a different pair of columns 8. The tops of the columns 8 support a working platform 10. The upper ends of the two diagonal beams 9 of each truss 9, 11 are secured to the bottom surface of the working platform 10. The lower horizontal truss beam 11 extends between and is secured to the upper surface of each hull 4 and the adjacent outer surface of each column 8 of the corresponding pair of columns 8.

Ballast chambers (not shown) are provided to permit the hulls 4 to be moved between a submerged condition and a surface floating, hull supported condition. The ballast chambers may be provided in various configurations and may be situated in the columns 8 as well as in the hulls 4. The hulls 4 have sufficient displacement to support the vessel 2 on the surface when the vessel 2 has a heavy deck load. The hulls 4 are compartmented transversely and longitudinally to form ballast chambers and chambers for storing drill water, potable water, and fuel. Selected ballast compartments may be ballasted and deballasted to submerge and float the vessel 2 and to induce heel or trim angles when the hulls 4 are submerged. Ballast may also be transferred between the hulls 4.

The configuration of the working platform 10 may be varied. It may be provided with a single deck or a plurality of decks. In the preferred embodiment, there are a plurality of decks including a first or main deck 12 that extends the full length and width of the vessel 2 and is adjacent to the upper end of each of the six columns 8. Spaced above the main deck 12 is a second or pipe rack deck 30 that is coextensive with the main deck 12 and extends over the entire vessel 2. On the aft end of the vessel 2 there is a helideck 38 to permit helicopters to land on the vessel 2. At the forward end of the vessel 2, there is a forward or bow deck 48 that has a forward end vertically aligned with the forward ends of the main deck 12 and pipe rack deck 30 and a rearward extent of about 13% of the length of the vessel 2. The portion of the pipe rack deck 30 between the helideck 38 and the bow deck 48 is open. As used herein, including the appended claims, the term "main deck portion" is used to mean the entire working platform 10 exclusive of the bow deck 48. The term "forward deck portion" refers to the bow deck 48. The main deck portion may include other decks in addition to the main deck 12, pipe rack deck 30, and helideck 38, for example an additional deck or decks between the main and pipe rack decks 12, 30.

The main deck structure is completely enclosed and compartmented similar to a barge to provide the vessel 2 with reserve buoyancy to increase the safety of the vessel 2. A bottom plate 66 (FIG. 7A) extends over the entire underdeck area of the main deck 12. A plurality of bulkheads (FIG. 11) extend vertically between the main deck 12 and pipe rack deck 30 to provide an additional sealable compartmented structure. The bulkheads include longitudinal bulkheads 14 extending the full length of the vessel 2. The outer bulkheads 14 have sealable access doors 15 to provide access for personnel into the enclosed area between the two decks 12, 30. The bulkheads also include lateral bulkheads 16 which extend fully or partially across the vessel 2 between the outermost longitudinal bulkheads 14.

Figure 11:
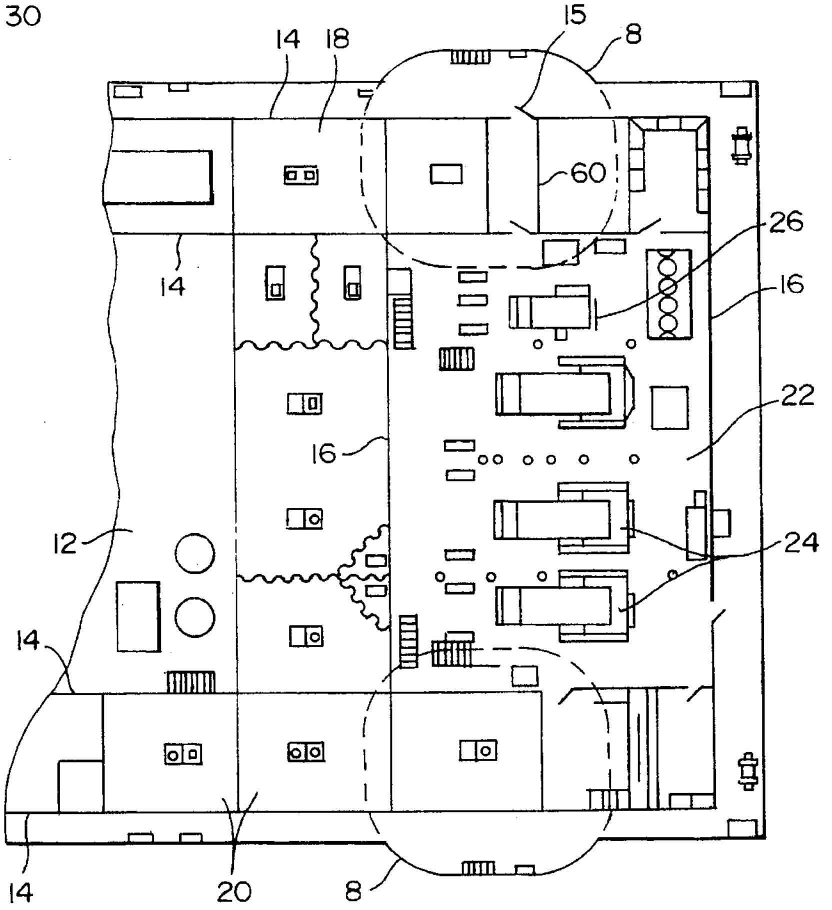
FIG. 11 is a partially schematic plan view of the forward portion of the main deck with the bow deck and pipe rack deck omitted.

The preferred embodiment of the vessel 2 also has a number of other features that contribute to its versatility and high level of operational efficiency. The plan configuration of the preferred embodiment has overall dimensions of about 308 feet by 118 feet to provide ample space for crew quarters and amenities and the various types of equipment, materials, and storage required for a self-contained operation of the vessel 2. Preferably, the vessel 2 has a mud system and a brine system that are entirely separate from each other. Referring to FIG. 11, a large pump compartment 22 is provided at the forward end of the main deck 12. The compartment 22 houses mud pumps 24 and a brine pump 26. Smaller compartments house brine tanks 18 and mud tanks 20. Additional main deck compartments house engines and generators, air compressors, crew quarters and amenities, workshops, and storage. Life boats 40 are mounted along the outer lateral edges of the main deck 12.

Figure 10:
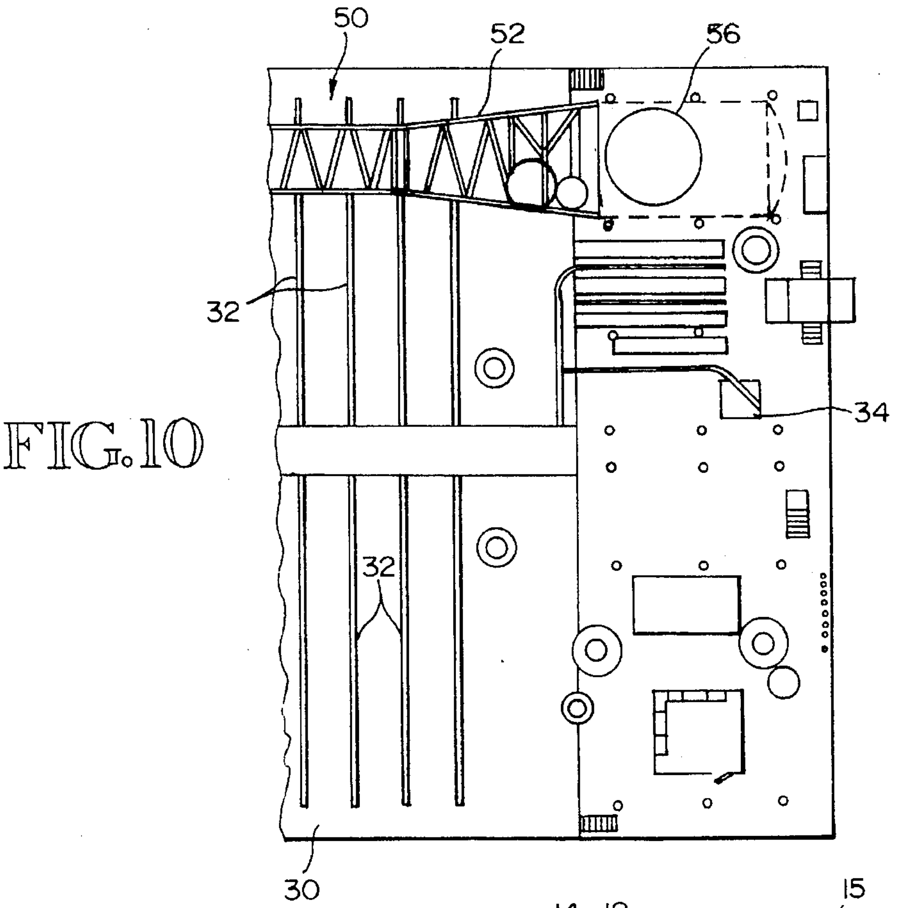
FIG. 10 is a partially schematic plan view of the forward portion of the pipe rack deck and the main crane, with the bow deck omitted and portions of the crane above the column support shown in phantom.

Slightly less than two thirds of the pipe rack deck 30 is open. The major portion of the open area is covered by pipe racks 32. Underneath the helideck 38, additional crew amenities are provided. The portion of the pipe rack deck 30 beneath the bow deck 48 includes storage areas. A plurality of hatches, such as the hatch 34 shown in FIG. 10, are provided to give personnel access between the pipe rack deck 30 and the main deck 12.

The vessel 2 has eight anchors 42, two positioned at each corner of the vessel 2. The anchors are positioned to provide the eight-point anchor configuration shown in FIG. 1. This configuration provides stable placement of the vessel 2 relative to a fixed-position work platform being serviced by the vessel 2. Referring to FIG. 14, the anchor winches 44 are preferably positioned in the interior of the corner columns 8. The anchor wires or lines 43 extend upwardly from the winches 44 in the columns 8 through anchor wire housings 46 and fairleads 47 to the anchors 42. In FIG. 14, a single anchor winch 44 is visible. The winch for the other anchor 42 not seen in FIG. 14 is positioned directly behind the illustrated winch 44.

Figure 8:
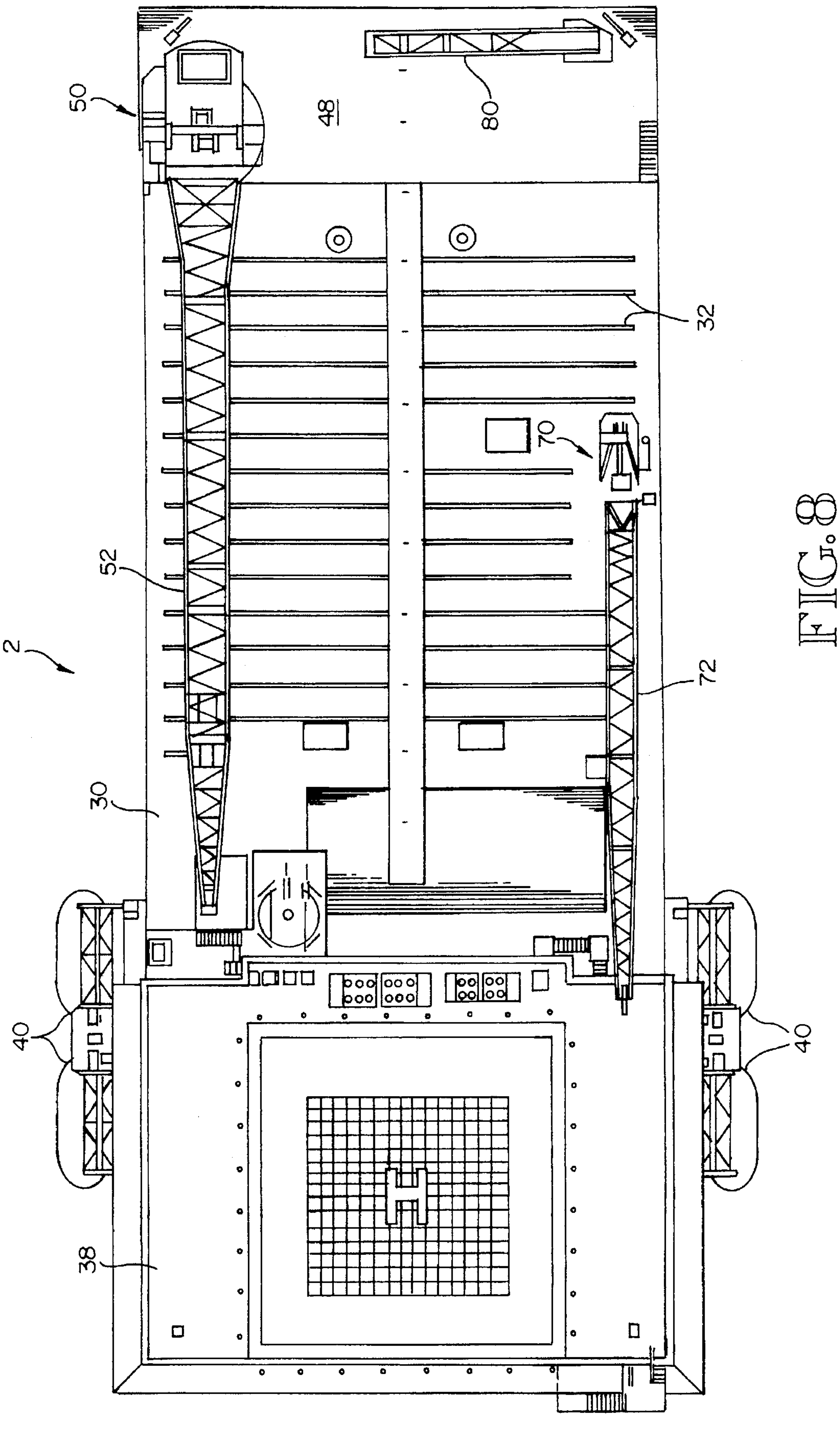
FIG. 8 is a plan view of the vessel shown in FIGS. 1–6.
Figure 9:
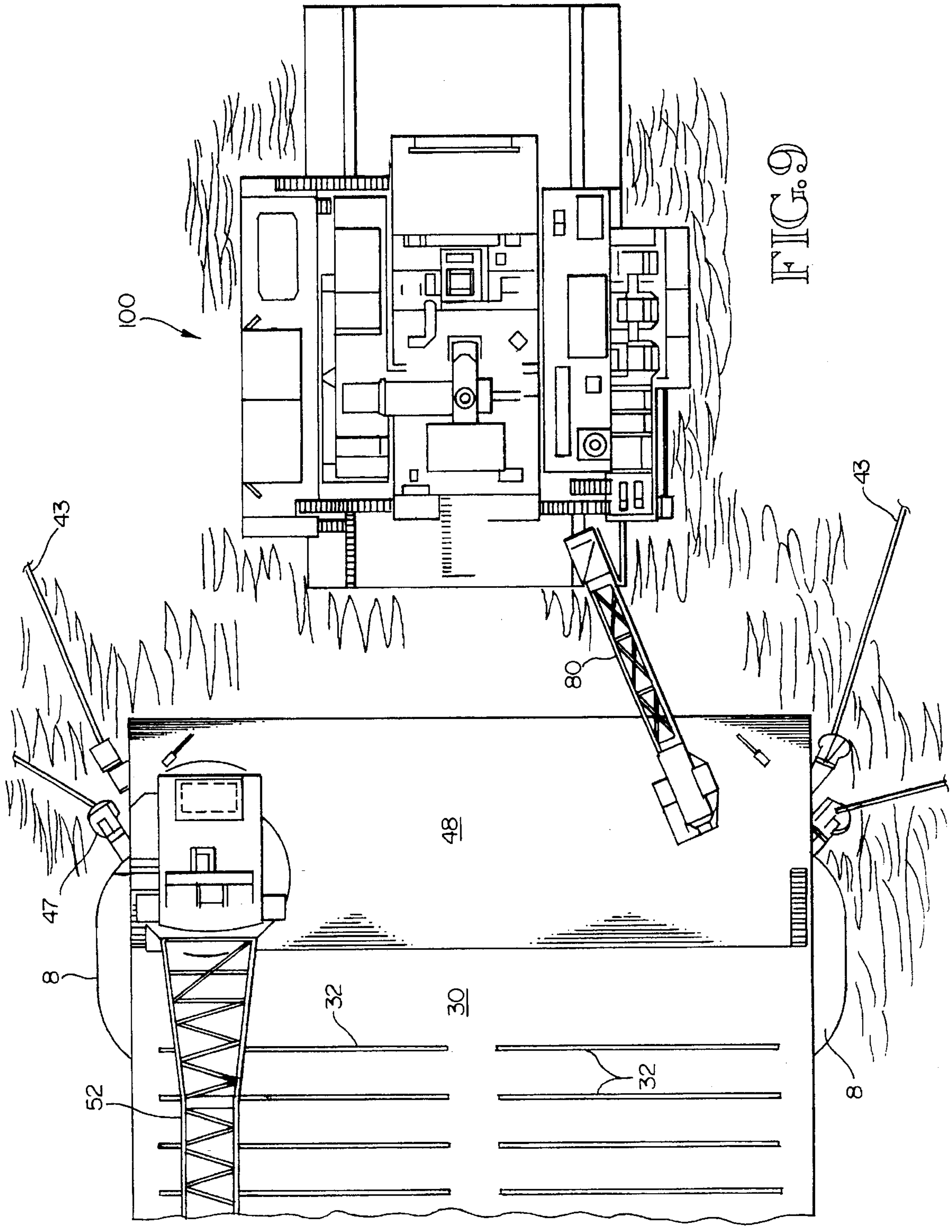
FIG. 9 is a plan view of the forward portion of the vessel and an adjacent fixed-position work platform.

A major feature of the invention is the high capacity main crane 50 mounted on the forward port corner of the vessel 2. The crane 50 has sufficient capacity to lift loads off the bow end and either side of the platform 10 and off the platform 10 from the bow end to about the helideck 38. The crane 50 has a boom 52, shown in an operational position in FIGS. 1, 4, and 5. A boom rest 53 is provided to support the boom 52 when the crane 50 is not in operation. FIG. 8 illustrates the boom 52 engaging the boom rest 53. The boom 52 is mounted to pivot on a crane base 54. Extending downwardly from the base 54 is a support structure for the crane that extends from the base 54 through the bow deck 48 at least to the main deck portion, i.e. to the pipe rack deck 30. Preferably, the support structure extends downwardly through the platform 10 to and down into one of the corner columns 8.

Figure 6:
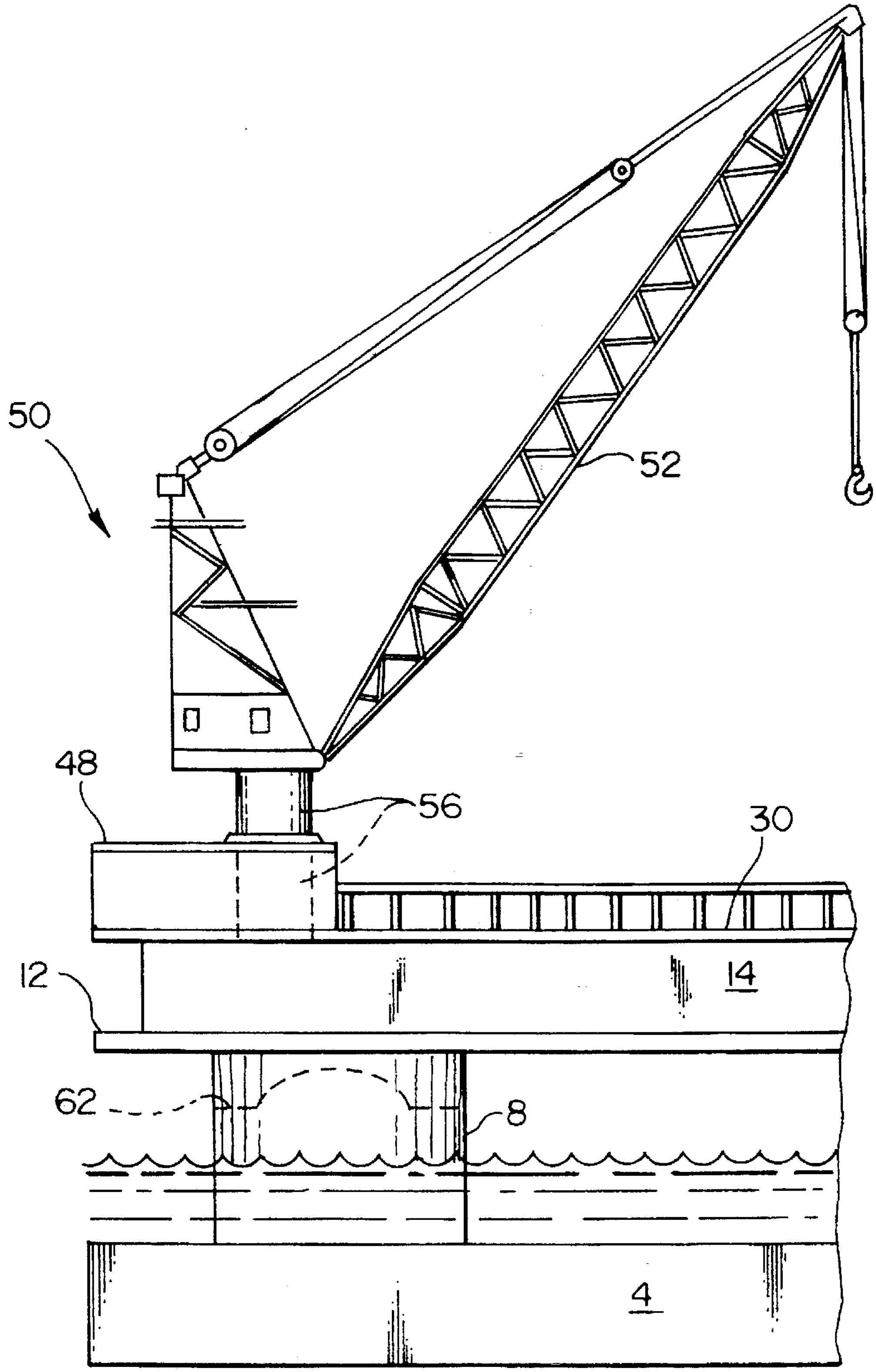
FIG. 6 is an elevational view of the forward portion of the port side of the vessel shown in FIGS. 1–5.

The details of the support structure for the crane can best be seen in FIGS. 6, 7A–7E, and 12. As can be seen in FIG. 12, the pivot axis of the crane 50 is aligned with the longitudinal centerline of the column 8. The crane axis is offset from the lateral centerline of the column 8, as shown in FIG. 6. This offset allows optimal positioning of the crane 50 relative to the forward end of the vessel 2 and thus to an adjacent fixed position work platform.

Figure 7A:
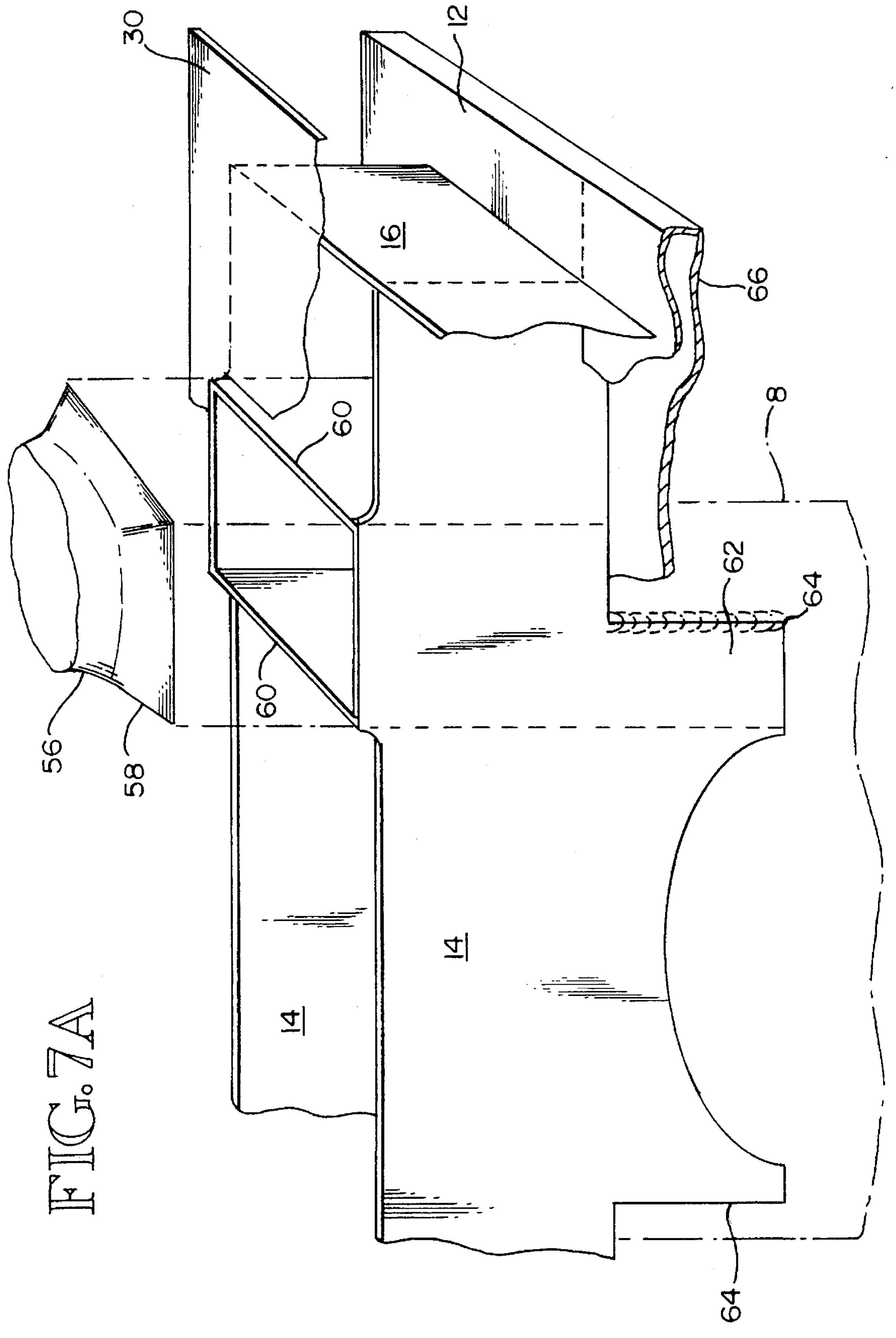
FIG. 7A is a partially exploded pictorial view of the preferred embodiment of the support structure for the main crane.

Referring to FIGS. 6, 7A–7E, and 12, the support structure for the crane includes a cylindrical crane column support 56 extending downwardly from the crane base. This column support 56 extends downwardly through the bow deck 48 to a vertical level close to the pipe rack deck 30. At this level, a transition portion 58 of the support structure is provided to create an interface between the cylindrical column support 56 and the lower rectangular portion of the support structure. This lower rectangular portion is provided by two of the longitudinal bulkheads 14 that extend between the main deck 12 and the pipe rack deck 30 and two forward bulkheads 60 that also extend between the two decks 12, 30. The upper portions of the bulkheads 14, 60 extend upwardly through the pipe rack deck 30 to meet the transition portion 58 of the support structure. The column support 56, transition portion 58, and bulkheads 14, 60 are integrally formed with each other and/or securely joined to provide a continuous path for transmitting forces created by operation of the crane 50 to the underlying column 8. Preferably, each of the four bulkheads 14, 60 has a downwardly extending portion 62 that extends downwardly into the column 8. The opposite vertical edges 64 of the downwardly extending portions 62 of each of the longitudinal bulkheads 14 are secured to the inner surface of the column 8, such as by welding. This completes the force pathway from the crane 50 to the column 8. As shown in FIG. 7A, the sealed bottom plate 66 of the main deck 12 interfaces with the outer surface of the column 8.

The vessel 2 may be provided with one or more auxiliary cranes in addition to the high capacity main crane 50. For example, a main crane with a dynamic capacity of 150 tons is preferably provided in conjunction with an auxiliary crane with a capacity of 50 tons. As shown in FIGS. 1, 2, 5, and 8, the auxiliary crane 70 is preferably mounted on the pipe rack deck 30 rearwardly of and laterally opposite the main crane 50. The auxiliary crane 70 has a boom 72 pivotably mounted on a base 74. A boom rest 73 is provided to support the boom 72 when the crane 70 is not in operation. A column support 76 for the crane 70 supports the crane on the vessel 2. Preferably, the column support 76 extends downwardly through the pipe rack deck 30 to the main deck 12 to enhance the stability of the crane mount and distribute the forces created by operation of the crane 70. The crane 70 may be operated simultaneously with the main crane 50.

Another feature of the invention is a personnel bridge mounted on the bow deck 48 laterally opposite the main crane 50. The bridge 80 has a first end pivotably mounted on the bow deck 48, and a second free end. The columns 8 are dimensioned, and the bow deck 48 has a height relative to the columns 8, to permit the bow deck 48 to be substantially vertically aligned with a fixed-position work platform being serviced by the vessel when the hulls 4 are in a submerged condition, such as the condition illustrated in FIGS. 3 and 4. This permits the bridge 80 to be pivoted to move its free end onto the work platform 100 with the bridge in a substantially horizontal position to maximize ease of transit by personnel over the bridge 80 between the vessel 2 and the fixed work platform 100. The use position of the bridge is illustrated in FIGS. 1, 3, 5, 9, and 13.

The preferred structure of the bridge 80 and its mounting is illustrated in FIG. 13. A cylindrical support 82 extends upwardly from the bow deck 48 and pivotably mounts the first end of the bridge 80. The support 82 is provided with a powered pivot ring 84 for pivoting the bridge 80 about the vertical axis of the support 82. A boom hoist 86 at the upper end of the support 82 is provided to permit pivoting of the free end of the bridge 80 upwardly and downwardly about an axis defined by the point of connection between the powered pivot ring 84 and the bridge 80. An additional pivot ring 88 is positioned just below the boom hoist 86. The bridge 80 has two telescoping portions and is provided with a constant tension winch 90 and rollers 92 to provide telescoping movement and maintain the stability of the bridge 80. A gimbal 94 is provided at the free end of the bridge 80 to maintain the horizontal orientation of the bridge 80 when there is relative movement between the vessel 2 and the fixed platform 100.

Figure 4:
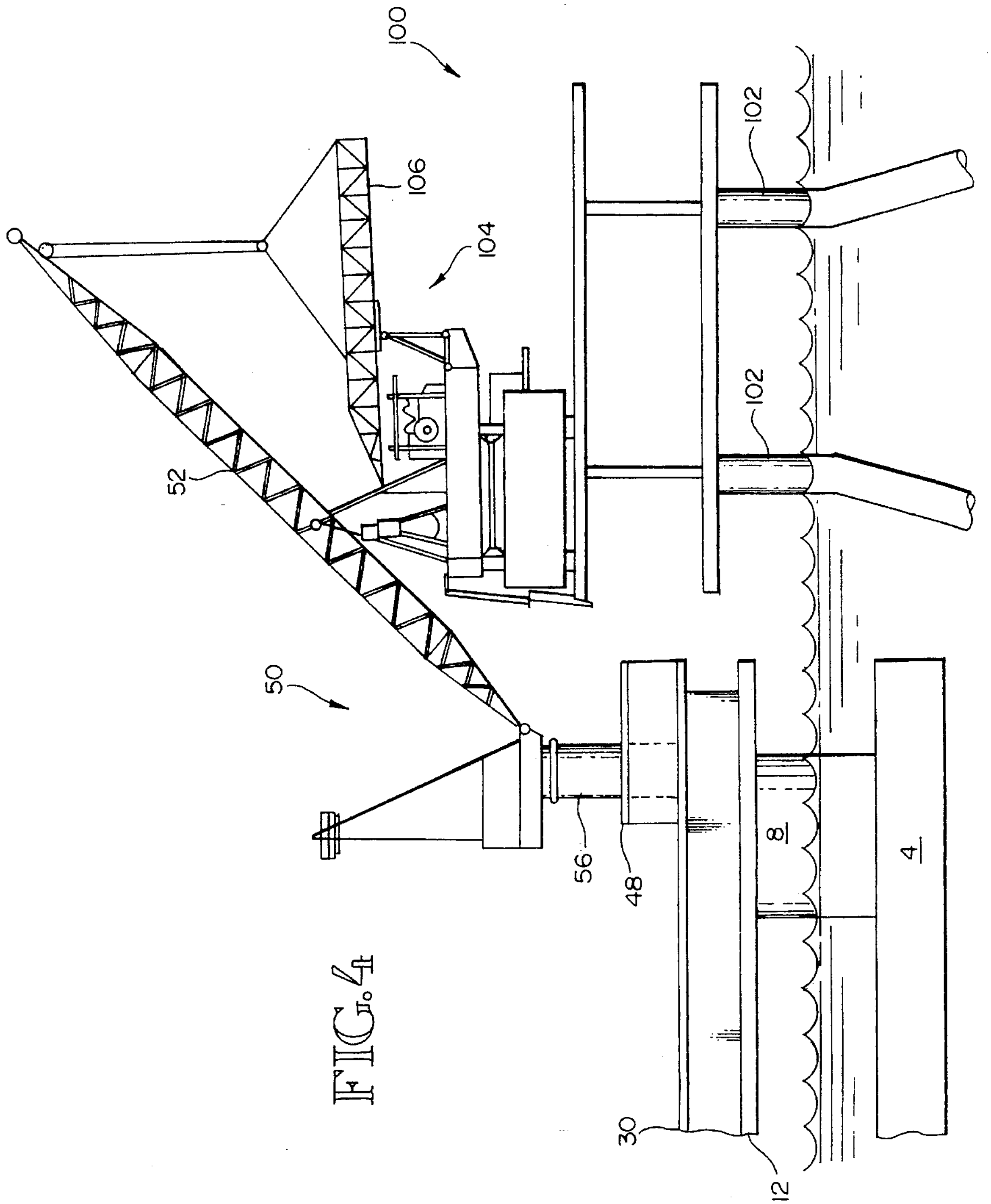
FIG. 4 is a simplified elevational view of the vessel bow portion and work platform shown in FIG. 3 and illustrates the placing of the mast of a derrick equipment set on the fixed work platform by use of the vessel's main crane.
Figure 5:
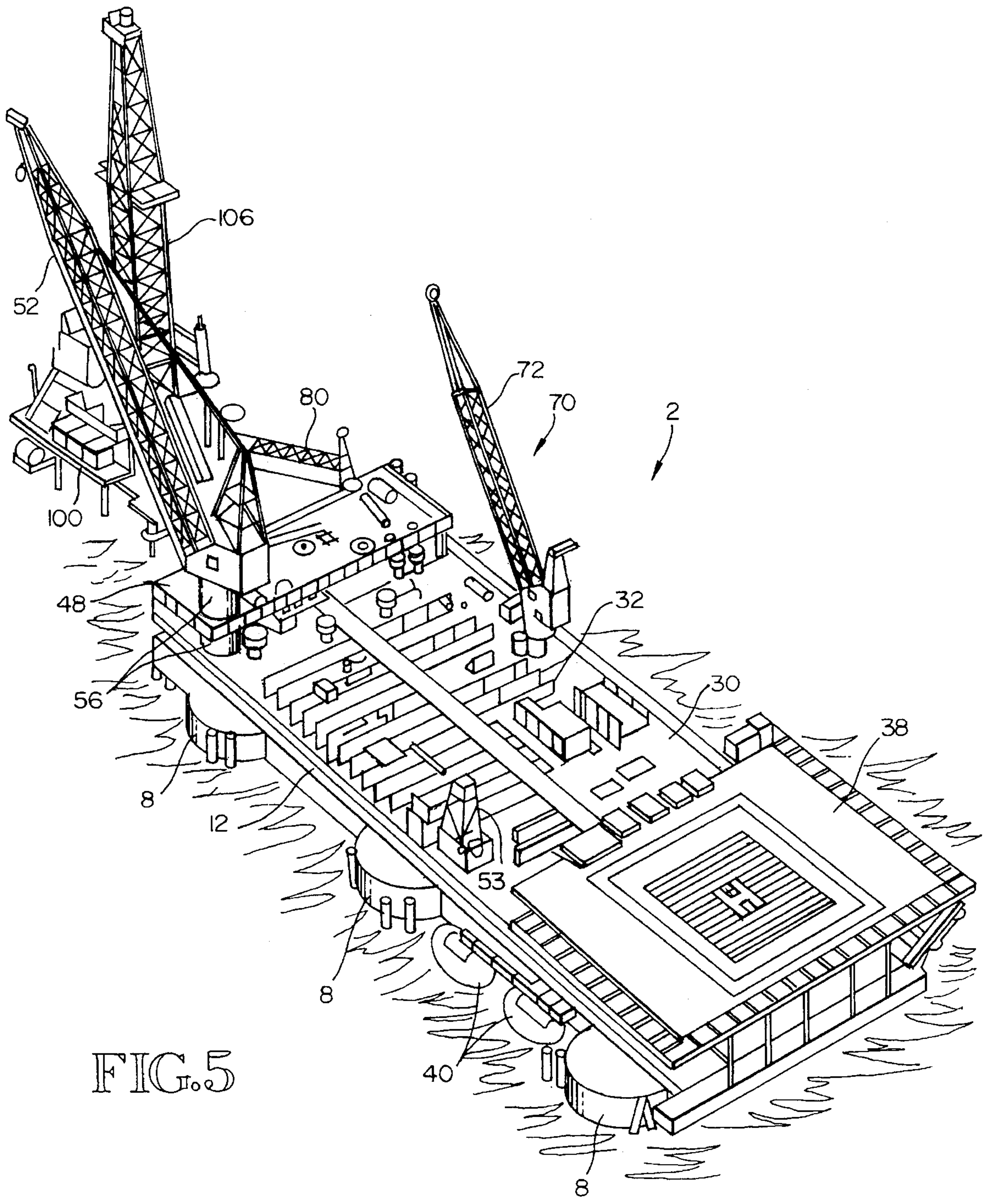
FIG. 5 is a pictorial view of the preferred embodiment looking down at the port side and aft end of the vessel.

In the operation of the vessel 2, the vessel 2 is towed to a work site for the purpose of erecting or dismantling or servicing a marine structure, such as the drilling platform 100 shown in FIGS. 1, 3–5, and 9. The platform 100 is erected on piles 102 driven into the sea floor to permanently maintain the platform 100 in a fixed position. As illustrated in FIG. 4, the main crane 50 of the vessel 2 may be employed to erect or dismantle a rig structure, such as the derrick equipment set 104 shown in FIGS. 1 and 3–5. For servicing, erecting, or dismantling operations, the vessel 2 is positioned with its bow end adjacent to the platform 100. The eight anchors 42 are deployed and the anchor lines 43 are tightened to maintain the vessel 2 in proper position. More specifically, FIG. 4 shows the crane 50 engaging the mast 106 of the derrick equipment set 104 preparatory to raising the mast 106. When the vessel 2 has been positioned and securely anchored, service lines 108 carried by the vessel 2 are connected to the platform 100 to connect the electric power, brine and mud systems of the vessel 2 to the platform 100.

For normal, i.e. relatively calm wave conditions, the crane 50 may be operated to lift and transfer loads between the vessel 2 and platform 100 up to the full tonnage capacity of the crane 50 to service the adjacent platform 100 while the vessel 2 is in a surface floating condition. In moderate or heavy seas having wave heights in excess of about five or six feet, vessel and crane operations are carried out with the vessel 2 in a semisubmerged condition in which the hulls 4 are submerged, as illustrated in FIGS. 1, 3–6, 12, and 14. To move the hulls 4 into a submerged condition from their surface floating towing condition, the hulls are ballasted, preferably by simultaneously ballasting selected ballast compartments in each hull, to submerge the hulls 4 below the water line. In most situations, it is optimal to submerge the hulls 4 so that the columns 8 are submerged for approximately half their effective height, i.e. to half the distance between the lower surface of the main deck 12 and the upper surface of the hulls 4.

Since the effective height of the columns 8 is chosen so that it is equal to and preferably greater than the maximum anticipated wave height from crest to trough, the ballasting of the hulls 4 to locate the mean water line halfway up the effective height of the columns 8 ensures that waves with heights up to or greater than the maximum anticipated wave height are prevented from acting against the hulls 4 and the working platform 10. The only portions of the vessel 2 on which there is motion-inducing wave action are the columns 8 and the open truss framework between the hulls 4 and the working platform 10. This reduces the adverse effect of wave action on the vessel 2 and gives the vessel excellent motion minimizing characteristics. In the semisubmerged condition of the vessel 2, the displacement of the submerged portions of the columns 8 and the residual displacement of the hulls 4 are sufficient to maintain the vessel 2 in the floating semisubmerged condition at the selected predetermined height.

The preferred embodiment of the vessel 2 is designed to operate efficiently and safely in sea states having waves of eleven or twelve feet in height or higher. However, even when the vessel 2 is operating within its design limits and in its semisubmerged condition, there is some vessel motion responsive to wave action due to the exposure of the columns 8 and trusses 9, 11 to the wave action. The natural period of the waves under certain conditions may be such that there is amplification of vessel motion which can become sufficient to interfere with operations. In such a circumstance, it is necessary and desirable to alter the motion of the vessel 2 by either ballasting or deballasting the vessel 2 within predetermined limits to submerge or emerge the vessel 2 to a greater or lesser extent from the ideal submergence discussed above in which the mean water line is at one half the effective height of the columns 8.

The ballasting of the hulls 4 is also normally adjusted to compensate for and minimize transverse inclinations of the vessel 2 about its heel axis caused by crane operations. Such inclinations are caused by slewing or pivoting of the crane 50 about its axis in either the loaded or unloaded condition because of the asymmetrical location of the load and/or counterweight. To maintain the comfort and safety of the operating personnel and to retain the crane slewing capability, the hull ballast compartments are selectively ballasted and deballasted in accordance with the rotational movement of the crane 50 to maintain the vessel heel angle within predetermined limits. Onloading or offloading may be conducted from either the port or starboard side of the vessel 2 or from the bow end of the vessel 2. In each case, the ballast compartments of each hull 4 are appropriately ballasted and deballasted to maintain load balance and heel angles within the prescribed limits.

In general, ballast redistribution and/or adjustment to submerge or emerge the vessel 2 to a greater or less extent from the ideal semisubmerged condition to minimize vessel motion amplification should be carried out so that the distance between the mean water line and either the underside of the main deck 12 or the top of the hull 4 is not less than three quarters of the mean wave height. For this purpose, the effective height of the columns 8 is preferably equal to or greater than one and a half times the mean wave height.

The columns 8 are located so that the hydrodynamic forces on the columns 8 act to establish righting moments proportional to the volumetric displacement of the submerged portions of the columns 8 about the roll and pitch axes to locate and maintain the metacenter of the vessel 2 above the vessel's center of gravity in each of the ballasting conditions discussed above. In addition, the area and number of the columns 8 and the distance of the columns 8 from the longitudinal and transverse centerlines of the vessel 2 are such that there is a greater righting moment about the transverse pitch axis than the righting moment about the longitudinal roll axis when the vessel 2 is in a semisubmerged condition.

When the operations at a work site have been completed, the vessel's ballast compartments are deballasted to refloat the vessel 2 and move the hulls 4 into a surface floating condition. The booms 52, 72 of the cranes 50, 70 are moved into horizontal positions resting on their respective boom rests 53, 73. The vessel 2 is then towed to another work site or a home port.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A semisubmersible floating vessel having a pair of substantially parallel, laterally spaced buoyant hulls with ballast chambers to permit said hulls to be moved between a submerged condition and a surface floating condition, a row of columns supported by and extending upwardly from each said hull, and a working platform supported by the upper ends of said columns, wherein the improvement comprises:

a crane mounted on said platform adjacent to an end of said platform, said crane having sufficient capacity to lift loads off said end of said platform and at least one side of said platform and from a portion of said platform extending from said end of said platform to at least about halfway to an opposite end of said platform; and a support structure for said crane; said structure extending downwardly from said crane, through said platform to one of said columns, and down into said one of said columns; and said structure interfacing with sidewall portions of said one of said columns to transmit forces created by operation of said crane to said one of said columns.

2. The vessel of claim 1, in which the platform includes a first deck adjacent to the upper ends of the columns, and a second deck spaced above the first deck; and the support structure includes a plurality of bulkheads extending vertically between said decks and having portions extending vertically down into said one of said columns.

3. The vessel of claim 2, in which said bulkheads have edge portions that are secured to inner surface portions of said one of said columns to transmit said forces to said one of said columns.

4. The vessel of claim 2, in which the platform further includes a forward deck positioned above a forward portion of said second deck, said crane is mounted on said forward deck, and said support structure includes a crane column support extending downwardly from said crane through said forward deck to said bulkheads.

5. The vessel of claim 4, further comprising a personnel bridge having a first end pivotably mounted on said forward deck, and a second free end; said columns being dimensioned, and said forward deck having a height relative to said columns, to permit said forward deck to be substantially vertically aligned with a fixed-position work platform being serviced by the vessel when said hulls are in a submerged condition, and in turn permit said bridge to be pivoted to move said free end onto said work platform.

6. The vessel of claim 4, in which said crane is a main crane mounted on a forward corner portion of the platform, and which further comprises an auxiliary crane mounted on said second deck rearwardly of and laterally opposite said main crane.

7. The vessel of claim 1, in which said crane is a main crane mounted on a forward corner portion of the platform, and which further comprises an auxiliary crane mounted on the platform rearwardly of and laterally opposite said main crane.

8. The vessel of claim 2, in which said crane is a main crane mounted on a forward corner portion of the platform, and which further comprises an auxiliary crane mounted on the platform rearwardly of and laterally opposite said main crane.

9. The vessel of claim 1, in which the platform forms a buoyant body to provide the vessel with reserve buoyancy.

10. A semisubmersible floating vessel having a pair of substantially parallel, laterally spaced buoyant hulls with ballast chambers to permit said hulls to be moved between a submerged condition and a surface floating condition, a row of columns supported by and extending upwardly from each said hull, and a working platform supported by the upper ends of said columns, wherein the improvement comprises:

a main deck portion of said platform supported by and extending over each of said columns and having a forward end;

a forward deck portion of said platform positioned above a forward portion of said main deck portion and having a forward end substantially aligned with said forward end of said main deck portion and a rearward extent sufficiently short to leave at least about one half of said main deck portion uncovered;

a crane mounted on said forward deck portion of said platform, said crane having sufficient capacity to lift loads off said forward ends and at least one side of said platform and from a portion of said main deck portion extending rearwardly from said forward deck portion to a location about halfway from said forward end of said main deck portion to an opposite end of said main deck portion;

a support structure for said crane; said structure extending downwardly from said crane, through said forward deck portion at least to said main deck portion; and a personnel bridge having a first end pivotably mounted on said forward deck portion, and a second free end; said columns being dimensioned, and said forward deck portion having a height relative to said columns, to permit said forward deck portion to be substantially vertically aligned with a fixed-position work platform being serviced by the vessel when said hulls are in a submerged condition, and in turn permit said bridge to be pivoted to move said free end onto said work platform.

11. The vessel of claim 10, in which said main deck portion includes a first deck adjacent to the upper ends of the columns, and a second deck spaced above the first deck; and the support structure includes a plurality of bulkheads extending vertically between said first and second decks, and a crane column support extending downwardly from said crane through said forward deck portion to said bulkheads.

12. The vessel of claim 11, in which said crane is a main crane mounted on a forward corner portion of the platform, and which further comprises an auxiliary crane mounted on said second deck rearwardly of and laterally opposite said main crane.

13. The vessel of claim 10, in which the platform forms a buoyant body to provide the vessel with reserve buoyancy.

14. A semisubmersible floating vessel having a pair of substantially parallel, laterally spaced buoyant hulls with ballast chambers to permit said hulls to be moved between a submerged condition and a surface floating condition, a row of columns supported by and extending upwardly from each said hull, and a working platform supported by the upper ends of said columns, wherein the improvement comprises:

a main deck portion of said platform supported by and extending over each of said columns and having a forward end;

a forward deck portion of said platform positioned above a forward portion of said main deck portion and having a forward end substantially aligned with said forward end of said main deck portion and a rearward extent sufficiently short to leave at least about one half of said main deck portion uncovered;

a crane mounted on said forward deck portion of said platform, said crane having sufficient capacity to lift loads off said forward ends and at least one side of said platform and from a portion of said main deck portion extending rearwardly from said forward deck portion to a location about halfway from said forward end of said main deck portion to an opposite end of said main deck portion; and a personnel bridge having a first end pivotably mounted on said forward deck portion, and a second free end; said columns being dimensioned, and said forward deck portion having a height relative to said columns, to permit said forward deck portion to be substantially vertically aligned with a fixed-position work platform being serviced by the vessel when said hulls are in a submerged condition, and in turn permit said bridge to be pivoted to move said free end onto said work platform.

15. The vessel of claim 14, in which said crane is a main crane mounted on a forward corner portion of the platform, and which further comprises an auxiliary crane mounted on the platform rearwardly of and laterally opposite said main crane.

16. The vessel of claim 14, in which the platform forms a buoyant body to provide the vessel with reserve buoyancy.

* * * * *